US012346605B1

(12) United States Patent
Nie

(10) Patent No.: US 12,346,605 B1
(45) Date of Patent: Jul. 1, 2025

(54) DATA ACCESS CONTROL FOR DATAFLOW COMPUTING SYSTEMS

(71) Applicant: Apple Inc., Cupertino, CA (US)

(72) Inventor: Xiaoning Nie, Neubiberg (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/446,523

(22) Filed: Aug. 9, 2023

(51) Int. Cl.
G06F 3/06 (2006.01)

(52) U.S. Cl.
CPC ............ G06F 3/0659 (2013.01); G06F 3/061 (2013.01); G06F 3/0673 (2013.01)

(58) Field of Classification Search
CPC ....... G06F 3/0659; G06F 3/061; G06F 3/0673
USPC ........................................................ 711/168
See application file for complete search history.

(56) References Cited

U.S. PATENT DOCUMENTS

| 5,937,205 | A | 8/1999 | Mattson et al. | |
|---|---|---|---|---|
| 6,412,077 | B1 | 6/2002 | Roden et al. | |
| 6,788,697 | B1* | 9/2004 | Aweya | H04L 49/9036 370/252 |
| 11,328,222 | B1* | 5/2022 | Matthews | H04L 47/2441 |
| 2002/0110137 | A1* | 8/2002 | Nie | H04L 47/10 370/429 |
| 2016/0098201 | A1 | 4/2016 | Kim et al. | |
| 2018/0136838 | A1 | 5/2018 | White et al. | |
| 2019/0243651 | A1* | 8/2019 | Venkataramani | G06F 9/52 |
| 2020/0045134 | A1 | 2/2020 | Rozas | |
| 2020/0371714 | A1 | 11/2020 | Li et al. | |

OTHER PUBLICATIONS

Arthur H. Veen, Dataflow Machine Architecture, ACM Computing Surveys, vol. 18, No. 4, Dec. 1986. 32 pages.
Demers et al. "Analysis and Simulation of a Fair Queueing Algorithm", ACM SIGCOMM Computer Communication Review, vol. 19, Issue 4, Sep. 1989, pp. 1-12.
Culler, D. et al., Parallel Computer Architecture, Morgan Kaufmann, 1999, pp. 47-49.

* cited by examiner

*Primary Examiner* — Gautam Sain
*Assistant Examiner* — Wei Ma
(74) *Attorney, Agent, or Firm* — Sterne, Kessler, Goldstein & Fox P.L.L.C.

(57) ABSTRACT

The present disclosure describes a system including a data storage device coupled to and shared by first and second processing devices and controlled by a data access controller. The data access controller can receive a data access request from the first processing device to access a first number of data storage units of the data storage device. A current storage unit count represents a second number of data storage units occupied in the data storage device. The data access controller can determine an updated storage unit count based on the current storage unit count and the first number of data storage units. In response to the updated storage unit count being below an upper threshold value and above a lower threshold value, the data access controller can grant the data access request to access the first number of data storage units of the data storage device.

20 Claims, 7 Drawing Sheets

DATA ACCESS CONTROL FOR DATAFLOW COMPUTING SYSTEMS

FIELD

The present disclosure relates to dataflow computing systems and, in particular, to data access control for dataflow computing systems.

BACKGROUND

A computing device or system is an electronic device that receives inputs, processes the inputs, and then produces results from the inputs. A general purpose computing device can be controlled by a processor operating software to perform many functions. The general purpose computing device can include a desktop computer, a laptop computer, a smartphone, a tablet, or other similar devices. In contrast, a dedicated computing device can perform specific functions, such as network switching and network routing functions. A dataflow computing device or system can be a parallel computing device where activation of processing is determined by the availability of its input data. For example, a dataflow computing device can be a general purpose computing device that includes a set of universal processing units, such as an arithmetic logic unit (ALU). Dataflow computing device can be limited to considering input data storage for data availability to enable data processing.

SUMMARY

Embodiments of the present disclosure include a dataflow computing system having multiple processing devices, such as a first processing device and a second processing device coupled to a shared data storage device. At least one data access controller is coupled to the data storage device shared between the first processing device and the second processing device, where the data access controller is configured to control access, such as granting a data access request or denying the data access request, to the data storage device.

In some embodiments, a system can include multiple processing devices (e.g., a first processing device and a second processing device), at least one data storage device coupled to and shared by the first and second processing devices, and at least one data access controller coupled to the at least one data storage device. In some embodiments, the at least one data storage device can include a first in first out (FIFO) queue. In some embodiments, the first processing device can be a producer processing device, and the second processing device can be a consumer processing device.

In some embodiments, the first processing device can include an operational circuit configured to generate data and a first storage device configured to store the generated data to be written into a first number of data storage units of the shared data storage device. The second processing device can include a second storage device configured to store data read from the first number of data storage units of the shared data storage device. In addition, the second processing device can include another operational circuit configured to perform a function different from that of the operational circuit of the first processing device. In some embodiments, the first processing device or the second processing device can include a plurality of configuration registers configured to store static configuration parameters for the first processing device or the second processing device, respectively. In some embodiments, the first processing device or the second processing device can include a hierarchical processing device that includes a third processing device and a fourth processing device coupled to a second data access controller and a second data storage device within the hierarchical processing device.

In some embodiments, the data access controller can be configured to receive a data access request from the first processing device or the second processing device to access a first number of data storage units of the at least one data storage device. A current storage unit count represents a second number of data storage units occupied in the at least one data storage device. The data access controller can be configured to determine an updated storage unit count based on the current storage unit count and the first number of data storage units. In response to a determination that the updated storage unit count is below an upper threshold value and above a lower threshold value, the data access controller can grant the data access request to access the first number of data storage units. In response to a determination that the updated storage unit count is above the upper threshold value or below the lower threshold value, the data access controller can be configured to deny the data access request. In some embodiments, the system can further include a control processing device configured to provide the upper threshold value and the lower threshold value to the data access controller.

In some embodiments, the data access request can be a write request received from the first processing device, which can be a producer processing device. In response to a determination that the updated storage unit count is below an upper threshold value and above a lower threshold value, the data access controller can generate a write signal to write data from the producer processing device to the first number of data storage units and to change the current storage unit count to the updated storage unit count. On the other hand, in response to a determination that the updated storage unit count is above the upper threshold value or below the lower threshold value, the at least one data access controller can deny the write request. The first processing device can store the generated data in the first storage device in response to the write request being denied.

In some embodiments, the data access request can be a read request received from the second processing device, which can be a consumer processing device. In response to a determination that the updated storage unit count is below an upper threshold value and above a lower threshold value, the data access controller can generate a read signal to enable reading, by the consumer processing device, data from the first number of data storage units. The data access controller can remove data from the first number of data storage units after the data has been read and change the current storage unit to the updated storage unit count. On the other hand, in response to a determination that the updated storage unit count is above the upper threshold value or below the lower threshold value, the data access controller can deny the read request. The second processing device can resend the read request after a period of time from when the read request is denied.

In some embodiments, the system can be configured to perform communication network system functions, and the upper threshold value and the lower threshold value can be determined based on bandwidth requirements of the communication network system.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1A:
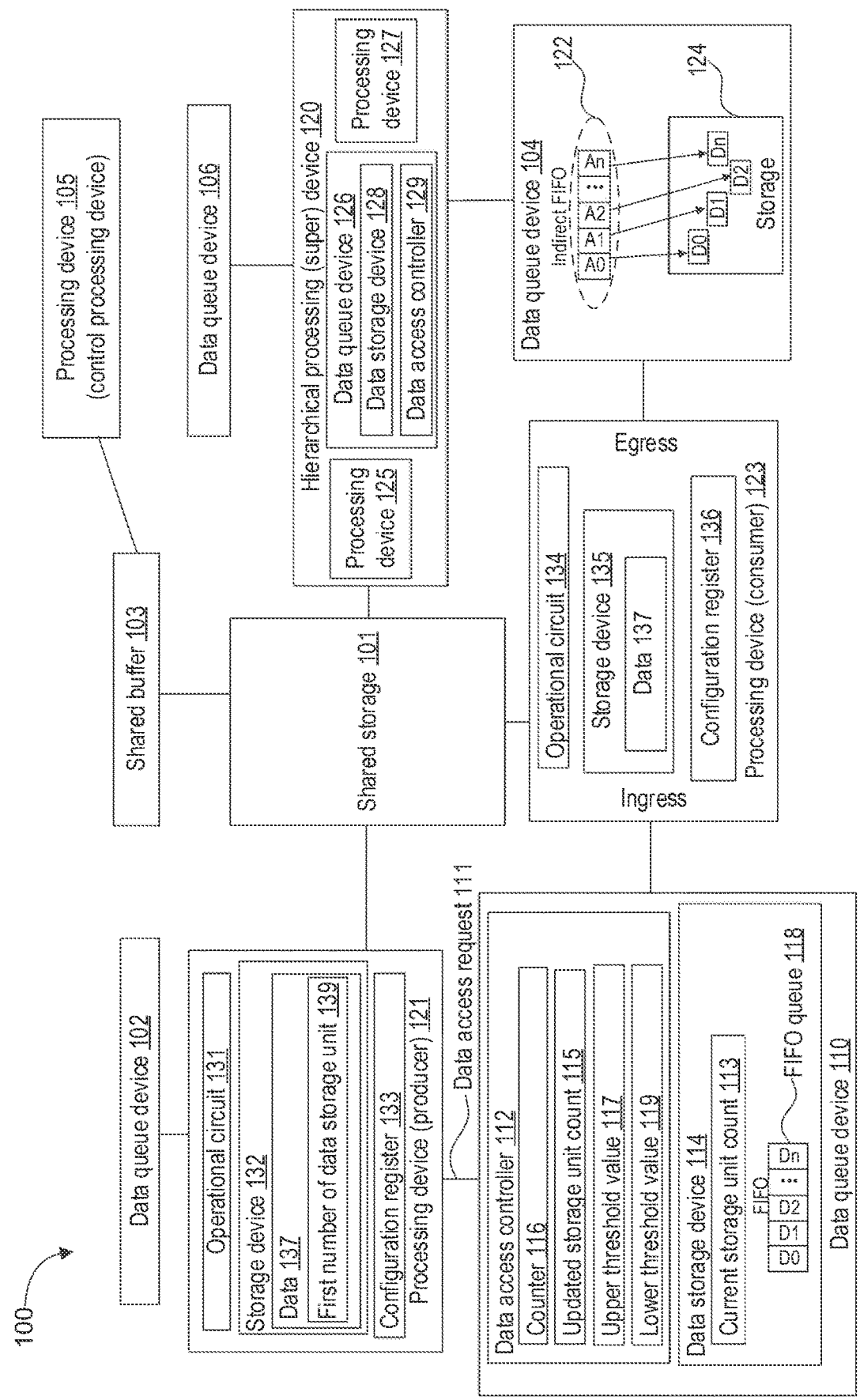
FIGS. 1A-1B illustrate a system including a data access controller to control access to a data storage device shared among multiple processing devices, according to some embodiments.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

A dataflow computing device or system can be a parallel computing device including a number of universal processing units, such as an arithmetic logic unit (ALU), similar to a Von Neumann computer. The universal processing units can have the same structure and perform the same function. Operations of the dataflow computing system can be autonomously driven by data and does not require further functional control. A first processing device of the dataflow computing system may perform operations to produce data and supply the data to a second processing device directly coupled to the first processing device. Once the data is available to the second processing device, the second processing device can start operations. Accordingly, operations of a processing device of the dataflow computing system are determined solely by data available to the processing device, without considering temporal behavior of the processing device.

Embodiments herein present a dataflow computing system including multiple processing devices coupled to shared data storage devices, where access to the shared data storage devices can be controlled by a data access controller coupled to the data storage device. A first processing device may have a different architecture for executing functions from a second processing device. A shared data storage device can be placed between the first and second processing devices. The shared data storage device is different from a queue or buffer within the first processing device or the second processing device that is accessible by, for example, a single processing device only. In addition, the data access controller can control whether the first processing device or the second processing device can access the shared data storage device.

In some embodiments, the data access controller can control access to the shared data storage device to adjust a temporal behavior, such as a delay time of data traffic, of the first processing device or the second processing device. In some embodiments, the first processing device can provide, such as write, data traffic to the shared data storage device. The second processing device can consume, such as read, data traffic from the shared data storage device. Hence, the first processing device may be referred to as a "producer processing device" and the second processing device may be referred to as "a consumer processing device." The shared data storage device can have a capacity defined by a number of data storage units, and the data access controller controls access to the shared data storage device based on a current storage unit count representing a number of data storage units occupied in the data storage device at the current time instance. Instead of providing data produced by a producer processing device directly to a consumer processing device when the data is available, the data access controller can store the available data into the data storage device based on the current storage unit count and a size of the data produced. Accordingly, operations of the consumer processing device depend not only on the availability of input data, but also on the storage availability of the shared data storage device. Therefore, the data access controller can ensure that the computation meets specific timing requirements for the consumer processing device, in terms of achieved bandwidth (data rates) and finishing time. In addition, a processing device can be a hierarchical processing device including multiple heterogeneous processing devices, which are characterized by their functional and temporal behaviors.

Embodiments herein present an autonomous computing architecture (ACAR) that performs operations based on the availability of data and events (e.g., as special types of data) that may be generated by the data access controller. The ACAR system takes into consideration the interworking of a set of hierarchical processing devices. The scheduling of operations of each hierarchical processing device is not controlled by a central functional program, or a central controller at a top-level of the hierarchy. Instead, the operations of each hierarchical processing device can be controlled by considering both the availability of a set of data and events. Accordingly, the ACAR system can function with reduced top-level control overhead compared to a centralized architecture, but relying on modular processing devices that can be flexibly added, removed, replaced, or configured, and each processing device can operate in parallel. Such a dataflow computing system can be applicable to perform networking functions, such as voice communication among users or devices, to meet certain bandwidth requirements. In addition, embodiments herein can be scalable from a single functional device on a chip to a pair of communicating devices or to a network of communicating systems, including more than two devices. Accordingly, the ACAR system can be useful for optimizing key performance indicators, such as performance, power consumption, and costs, of a communication system.

Figure 1B:
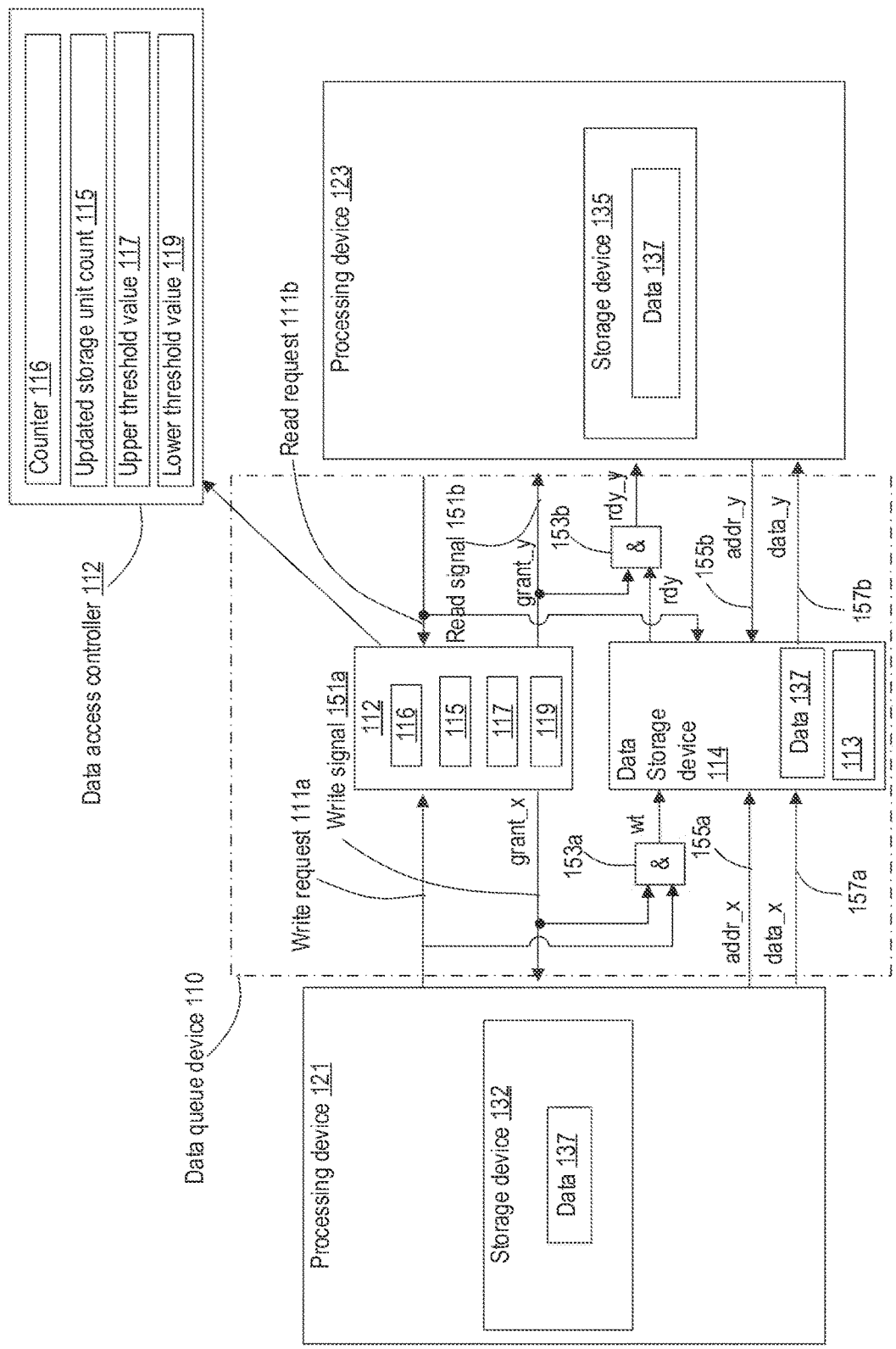

FIGS. 1A-1B illustrate a system 100 including a data access controller 112 to control access to a data storage device 114 shared among multiple processing devices, according to some embodiments. In some embodiments, data storage device 114 can be shared by a processing device 121 and a processing device 123. System 100 is provided for the purpose of illustration only and does not limit the disclosed aspects.

In some embodiments, system 100 can be a dataflow computing system including multiple processing devices, such as processing device 121, processing device 123, a processing device 105 that is a control processing device, and a processing device 120 that is a hierarchical processing device. In some embodiments, processing device 121, processing device 123, processing device 105, and processing device 120 can be connected over data buffers (e.g., data queue devices), signals, and registers, as described below. A signal is a type of data having a sender and one or more receivers, such as a data access request 111. In some embodiments, the signals can be onetime events that can be acknowledged or cleared by the receiver. In addition, registers can be storage devices to store different types of data, such as static data or slowly varying configuration parameters (e.g., a configuration register 133 of processing device 121 or a configuration register 136 of processing device 123).

In some embodiments, a data queue device can be between two processing devices and coupled to the two processing devices. As shown in FIGS. 1A and 1B, data queue device 102 is coupled to processing device 121, and data queue device 110 is placed between and coupled to processing device 121 and processing device 123. Similarly, data queue device 104 is placed between and coupled to processing device 123 and processing device 120, and data queue device 106 is coupled to processing device 120. In addition, processing device 105, which is a control processing device, can be coupled to a shared buffer 103 and a shared storage device 101. In some embodiments, shared buffer 103 and shared storage device 101 can be accessible by more than two processing devices, including processing device 121, processing device 123, processing device 120, and processing device 105. In some embodiments, data queue device 110 can be shared by only two processing devices, including processing device 121 and processing device 123.

In some embodiments, a data queue device, such as data queue device 110, can include a data storage device and a controller. For example, data queue device 110 can include data access controller 112 and data storage device 114. In some embodiments, data queue device 110 is coupled to a first processing device 121 that can be a producer processing device and a second processing device 123 that can be a consumer processing device. In some embodiments, data storage device 114 can include a first in first out (FIFO) queue 118 or other similar data structures. A FIFO queue can include multiple registers to store data, which can be pushed in by a producer processing device, and fetched and popped up by a consumer processing device. In some embodiments, data queue device 104 can include an indirect FIFO 122 with addresses in the FIFO registers, such as A0, A1, A2, . . . , An, and the data, such as D0, D1, D2, . . . . Dn, stored in a shared random accessible memory or other storage device 124. Indirect FIFO 122 can be implemented within data storage device 114 as well. In some embodiments, data storage device 114 can be organized as a queue, a stack, a linked list, or any other data structure. Data storage device 114 can have a capacity measured by a data storage unit, where a data storage unit can be defined by a bit, a byte, a word, or any other unit suitable for system 100.

In some embodiments, processing device 121 can include a counter 116 to store a current storage unit count 113 representing a number of data storage units occupied in data storage device 114. In addition, processing device 121 can include an operational circuit 131 to generate data 137 and a storage device 132 to store the generated data 137. Operational circuit 131 can perform a function, such as digitalize an analog voice or some other functions. Storage device 132 is different from data storage device 114 of data queue device 110, according to some embodiments. Storage device 132 is within processing device 121 and can only be accessible, e.g., write or read, by processing device 121, while data storage device 114 can be accessible, e.g., read or write, by both processing device 121 and processing device 123. Data 137 is first generated and stored in storage device 132 of processing device 121. Afterwards, data 137 can be provided to data queue device 110 when data access controller 112 grants permission for data 137 to be written into data storage device 114. Data 137 may have a size associated with a first number of data storage units 139.

In some embodiments, processing device 121 can include configuration registers 133 to store static configuration parameters for processing device 121. For example, configuration registers 133 can include a parameter about an allowed delay or performance for data 137 to be transmitted to data queue device 110.

In some embodiments, processing device 123 can have similar components as processing device 121 and can include an operational circuit 134, a storage device 135, configuration registers 136, and other components. In some embodiments, operational circuit 134 can perform a function different from operational circuit 131. For example, operational circuit 131 can perform operations to digitalize an analog voice to generate digital bytes of data to represent the analog voice, while operational circuit 134 can filter the digitalized data to enhance quality, such as smoothness. By having processing device 121 and processing device 123 perform different functions, system 100 can have improved performance as compared to other dataflow computing systems having all the data processing units with the same data processing unit architecture.

In some embodiments, processing device 123 can include storage device 135 to store data 137 read from the first number of data storage units of data storage device 114. Data 137 is first generated and stored in storage device 132 of processing device 121. Data 137 can be provided to data queue device 110 when data access controller 112 grants permission for data 137 to be written into data storage device 114. Processing device 123 can send a read request to data access controller 112 to request read access to data 137 stored in data storage device 114. Data access controller 112 may grant or deny such a read request from processing device 123. When data access controller 112 grants the read request, processing device 123 can read data 137 from data storage device 114 and store data 137 into storage device 135.

In some embodiments, processing device 120 is a hierarchical processing device that includes a processing device 125 and a processing device 127 coupled to a data queue device 126 that includes a data access controller 129 and a data storage device 128 within the hierarchical processing device. As a hierarchical processing device, processing device 120 can be referred to as a super processing device, a super-block, or top level processing device (TL-PD). On the other hand, a processing device, such as processing device 121, that is not a hierarchical processing device and does not include any processing device within may be referred to as a leaf processing device, a leaf processing block, or a processing sub-block. Processing device 125 and processing device 127 can be examples of leaf processing device 121 and leaf processing device 123, and data queue device 126 can be examples of data queue device 110, respectively. In addition, data access controller 129 and data storage device 128 can be examples of data access controller 112 and data storage device 114, respectively.

In some embodiments, a processing device, either a leaf processing device 123 or hierarchical processing device 120, can perform various functions including ingress functions, egress functions, and other inner operations. A processing device can also be in various states, such as an initial state; a processing state when operations are performed; a complete state when the operations are completed; or some other states. States of a processing device may be represented by a finite state machine, or any other models known to one having the ordinary skills in the art.

In some embodiments, the various operations can be performed by a processing device, either a leaf processing device 123 or hierarchical processing device 120. For example, a processing device can step through a current state of the finite state machine representing the operations of the processing device and enter a next state; perform ingress operations if the input queue is not ready or the destination buffer/queue is overflowed; and perform egress operations. if the output queue is full or the input queue/buffer is underflow.

In some embodiments, processing device 123 can perform autonomous operations expressed in principle as an infinite loop. Accordingly, if data 137 is served continuously, processing device 123 can perform operations continuously.

In some embodiments, hierarchical processing device 120 can further perform operations recursively. Initially, all processing devices including processing device 125 and processing device 127 of hierarchical processing device 120 can be in an initial state. Hierarchical processing device 120, which is a TL-PD, can receive a signal to transition into a processing state. The TL-PD can read out the configuration parameters from configuration registers. The TL-PD can calculate parameters for the processing sub-blocks, including processing device 125 and processing device 127, configure the registers for the processing sub-blocks, and send to each processing sub-block the signals for operations. After receiving the signal for operations from hierarchical processing device 120, each processing device of processing device 125 and processing device 127 can transition into a processing state, where they keep running autonomously. No further intermediate controlling intervention is required from any other controller. Optionally, a processing device, such as processing device 125 and processing device 127, can send a signal indicating operations are completed with the last processed data. The receiver processing device can return to the initial state as soon as the last remaining data is processed. If all processing sub-blocks have entered the initial state, the processing terminates for hierarchical processing device 120. If a processing super-block contains a set of processing sub-blocks, the execution function can be executed recursively.

In some embodiments, data access controller 112 can receive data access request 111 from processing device 121 to access first number of data storage units 139 for data 137 generated by operational circuit 131. Data access controller 112 can have a counter 116 to store current storage unit count 113 representing a second number of data storage units occupied in data storage device 114 at the time instance when data access request 111 is received. Data access controller 112 can determine an updated storage unit count 115 based on current storage unit count 113 and first number of data storage units 139. In some embodiments, updated storage unit count 115 can be a sum of current storage unit count 113 and first number of data storage units 139 when data access request 111 is a write request. In some other embodiments, updated storage unit count 115 can be a difference between current storage unit count 113 and first number of data storage units 139 when data access request 111 is a read request. In order for data access controller 112 to determine whether to grant data access request 111, data access controller 112 determines the impact of granting data access request 111 to data storage device 114. Accordingly, data access controller 112 determines an impact of granting data access request 111 to data storage device 114 by calculating updated storage unit count 115, assuming data access request 111 is to be granted.

In some embodiments, in response to a determination that updated storage unit count 115 is below an upper threshold value 117 and above a lower threshold value 119, data access controller 112 can grant data access request 111 to access first number of data storage units 139. On the other hand, in response to a determination that the updated storage unit count 115 is above upper threshold value 117 or below lower threshold value 119, data access controller 112 can deny the data access request 111.

In some embodiments, system 100 can further include processing device 105, which can be a control processing device configured to provide upper threshold value 117 and lower threshold value 119 to data access controller 112. The determination of upper threshold value 117 and lower threshold value 119 may be based on the performance requirements of system 100. In some embodiments, system 100 can perform communication network system functions, and upper threshold value 117 and lower threshold value 119 can be determined based on bandwidth requirements of the communication network system functions, such as a bandwidth requirement of a routing function of data traffic.

In some embodiments, a data access request can be a write request received from first processing device 121 (e.g., a producer processing device) or a read request received from second processing device 123 (e.g., a consumer processing device). With a write request, first processing device 121 requests a write access of first number of data storage units 139. Data access controller 112 can grant the write access as an atomic operation if first number of data storage units 139 added to current storage unit count 113 will not exceed upper threshold value 117. With a read request, second processing device 123 requests a read access of first number of data storage units 139. Data access controller 112 can grant the read access as an atomic operation if current storage unit count 113 will not fall under lower threshold value 119 after the read operation is performed. Counter 116 is incremented or decremented after each successful write or read.

In some embodiments, as shown in FIG. 1B, the data access request can be a write request 111a received from processing device 121, which can be a producer processing device. In response to a determination that the updated storage unit count 115 is below upper threshold value 117 and above lower threshold value 119, data access controller 112 can generate a write signal 151a to be sent to processing device 121. In some embodiments, write signal 151a can have a logic 1 to indicate a grant access to write request 111a and can be provided to an AND gate 153a to enable data 137 to be written to data storage device 114. Data 137 can be written to data storage device 114 based on address lines 155a provided by processing device 121 and data 137 is provided at line 157a. Accordingly, data 137 is written from processing device 121 to the first number of data storage units of data storage device 114.

In addition, data access controller 112 can update counter 116 to change counter 116 from current storage unit count 113 to the value of updated storage unit count 115, to reflect data 137 has been written into data storage device 114. The write request operation can be specified as push (n): push n storage units of data into data storage device 114, and counter 116=current storage unit count 113+n, when or after write request 111a is committed so that data 137 is visible to second processing device 123, where n is the size of data 137 indicated by first number of data storage units 139.

Figure 2A:
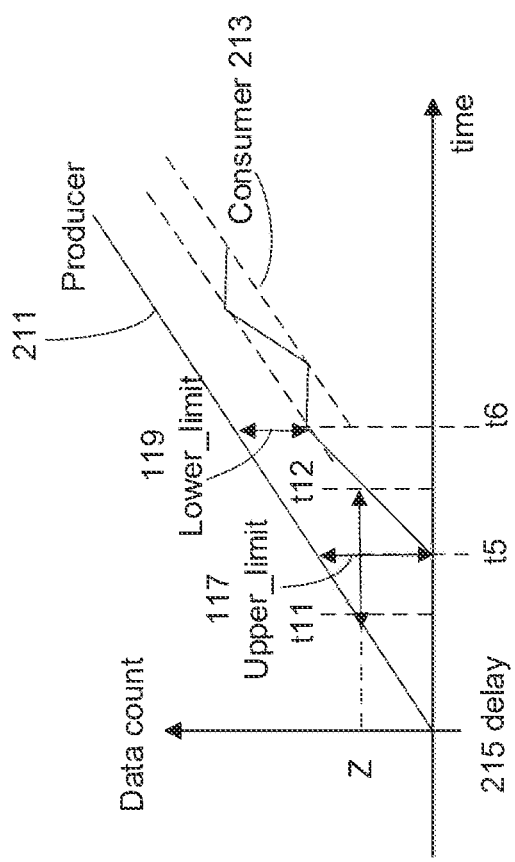
FIGS. 2A-2B illustrate an upper threshold value and a lower threshold value used by a data access controller to control access to a data storage device shared among multiple processing devices, according to some embodiments.

In some embodiments, the result of the value stored in counter 116 can be shown in FIG. 2A. At time t1, counter 116 stores current storage unit count 113. At time t2, after data access controller 112 allows data 137 to be written into data storage device 114, data access controller 112 can update counter 116 to store the value of updated storage unit count 115, as shown in time t2.

On the other hand, in response to a determination that the updated storage unit count 115 is above upper threshold value 117 or below lower threshold value 119, data access controller 112 can deny write request 111a. Data access controller 112 can set write signal 151a to be logic 0, which is provided to AND gate 153a to prevent data 137 from being written into data storage device 114. Accordingly, processing device 121 can store the generated data 137 in storage device 132 within processing device 121 in response to the write request being denied.

In some embodiments, as shown in FIG. 1B, the data access request can be a read request 111b received from processing device 123, which can be a consumer processing device. In response to a determination that the updated storage unit count 115 is below upper threshold value 117 and above lower threshold value 119, data access controller 112 can generate a read signal 151b to be sent to processing device 123 to enable reading data 137 from the first number of data storage units of data storage device 114. In some embodiments, read signal 151b can be logic 1 to indicate a grant access to read request 111b and can be provided to an AND gate 153b to enable data 137 to be read from data storage device 114. Data 137 can be read from data storage device 114 based on address lines 155b provided by processing device 123, and data 137 is provided to processing device 123 at line 157b.

In some embodiments, data access controller 112 can remove data 137 from the first number of data storage units of data storage device 114 after data 137 is read and change counter 116 from the value of current storage unit count 113 to the value of updated storage unit count 115. In some embodiments, read request 111b can include the following operations with respective implication for the value of current storage unit count 113 stored in counter 116:
  get(n): fetch n data storage units of data and no move of data pointer, no change of the value stored in counter 116;
  pop(n): skip or drop n data storage units of data and move pointer by n, counter 116=current storage unit count 113-n, when or before the pop operation is committed to be visible to first processing device 121; and
  get and pop(n): fetch and pop n units of data, counter 116=current storage unit count 113-n, where n is the size of data 137 indicated by first number of data storage units 139.

In some embodiments, the result of the value stored in counter 116 can be shown in FIG. 2A. At time t3, counter 116 stores current storage unit count 113. At time t4, after data access controller 112 allows data 137 to be read from data storage device 114, data access controller 112 can update counter 116 to store the value of updated storage unit count 115 as shown in time t4, which can be the value of pop (n) or get and pop (n).

On the other hand, in response to a determination that updated storage unit count 115 is above upper threshold value 117 or below lower threshold value 119, data access controller 112 can deny the read request by setting read signal 151b to be logic 0. Accordingly, processing device 123 can resend read request 151b after a period of time from when the read request 151b is denied.

Figure 2B:
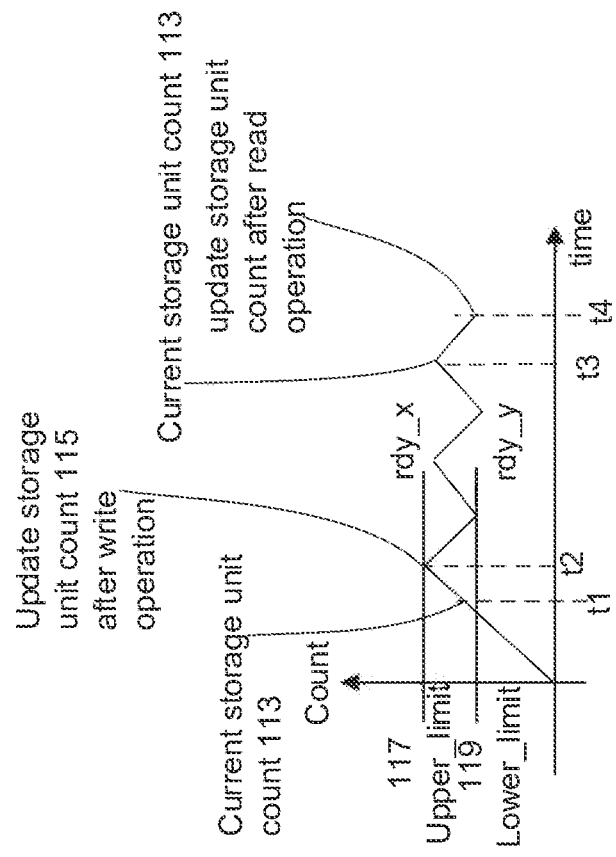

FIGS. 2A-2B illustrate an upper threshold value and a lower threshold value used by the data access controller to control access to a data storage device shared among multiple processing devices, according to some embodiments. In some embodiments, the upper threshold value and the lower threshold value shown in FIGS. 2A-2B are examples of upper threshold value 117 and lower threshold value 119 as shown in FIGS. 1A-1B. FIG. 2A has been described above. For illustrative purposes, FIG. 2B will be described with reference to system 100 shown in FIGS. 1A-1B, including data access controller 112 to control access to data storage device 114.

In some embodiments, FIG. 2B illustrates how first processing device 121 (e.g., a producer processing device) and second processing device 123 (e.g., a consumer processing device) behave with respect to the various threshold values controlled by data access controller 112. The producer curve 211 is an example to illustrate data arrival at a constant rate at data queue device 110 or data storage device 114. Consumer curve 213 is an example how data is drained from or consumed by data queue device 110 or data storage device 114. For any data storage unit count Z, a time difference—between a time instance t1 when first processing device 121 produces data of the size Z and a time instance t12 when second processing device 123 consumes data of the size Z—is the delay 215 for data 137 within data storage device 114. At time instance t5, a difference between a number of storage unit count produced by first processing device 121 and a number of storage unit count consumed by second processing device 123 can define a number of storage unit count of data being currently stored in data storage device 114. Accordingly, the maximum of such a difference at time instance t5 is bounded by upper threshold value 117 which can be referred to as an upper limit, and the minimal of such a difference at time instance t6 is bounded by lower threshold value 119 which can be referred to as a lower limit. In some embodiments, lower threshold value 119 can be 0, and upper threshold value 117 can be the same as the capacity of data storage device 114. In some embodiments, upper threshold value 117 can be smaller than the capacity of data storage device 114 but larger than lower threshold value 119 (that can be larger than 0).

In some embodiments, the larger the upper limit, the bigger the maximum delay a data unit Z will experience in data queue device 110. The lower the spread between upper and lower limits, the closer second processing device 123 is tracking first processing device 121. A lower spread between upper and lower limits can be achieved by controlling both the upper and lower limits. The bigger the spread between upper and lower limits, the more probable that second processing device 123 is running at a higher draining rate than first processing device 121. A small spread between upper and lower limits suggests that the circuit design of second processing device 123 is optimized for performance rather than for lower speed at a lower power supply voltage or lower power consumption. Accordingly, the circuit design for second processing device 123 is optimized for higher speed at a higher power supply voltage.

Figure 3:
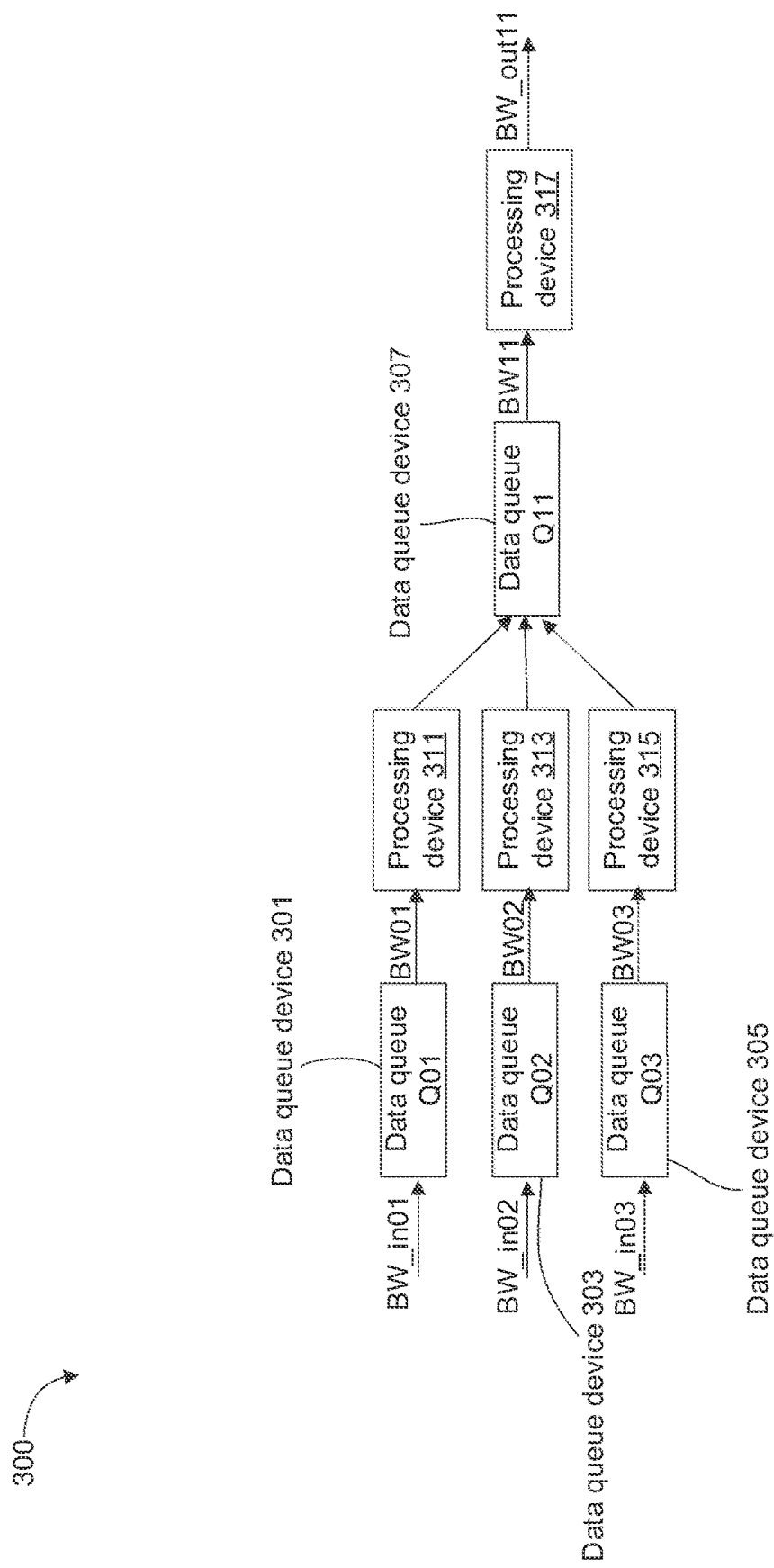
FIG. 3 is an illustration of a system including multiple processing devices coupled by multiple data queue devices, according to some embodiments.

FIG. 3 is an illustration of a system 300 including multiple processing devices coupled by multiple data queue devices, according to some embodiments. System 300 can be an example of system 100 shown in FIG. 1. In some embodiments, system 300 can be a digital communication system.

In some embodiments, system 300 can include a processing device 311, a processing device 313, a processing device 315, a processing device 317, a data queue device 301, a data queue device 303, a data queue device 305, and a data queue device 307. In some embodiments, data queue device 301 is coupled to processing device 311, data queue device 303 is coupled to processing device 313, data queue device 305 is coupled to processing device 315, data queue device 307 is coupled to processing device 311, processing device 313, processing device 315, and processing device 317. Each of data queue device 301, data queue device 303, data queue device 305, and data queue device 307 can be an example of data queue device 110 shown in FIG. 1A, and each of processing device 311, processing device 313, processing device 315, and processing device 317 can be an example of processing device 121, processing device 123, or processing device 120 as shown in FIG. 1A.

In some embodiments, system 300 can service data traffic with a specified (e.g., minimum and/or average) bandwidth (or data rates in bits per second). The bandwidth requirement can be defined and measured at the output (e.g., egress side) of a processing device or at a data queue device (DQ). If processing devices and data queue devices are coupled together in a chain, the egress bandwidth of a processing device becomes the input (e.g., ingress) bandwidth of the subsequent connected data queue device. Similarly, the egress bandwidth of the data queue device becomes the ingress bandwidth of the next processing device coupled to the data queue device.

In some embodiments, to ensure minimal (or no) bandwidth loss at a processing device or data queue device over time, the egress bandwidth may not be constantly less than the corresponding ingress ones. Consider a data queue device, given transmission duration of T seconds and an ingress data rate of R_in bits/s, the data arrived during time T is then T×R_in bits. With an egress data rate of R_out, the data leaving the data queue device is T×R out. The data residing in the data queue device at the end of T is Q=T × (R_in-R_out) bits, assuming the data queue device was empty at beginning of T. The bigger the difference of the ingress and egress bandwidth, the more system resources will be consumed, including more computing power (higher R_out) and bigger storage (higher Q).

In some embodiments, system 300 can have an ingress and egress bandwidth spread of zero. Accordingly, the following equations may hold:

Ingress bandwidth of data queue device 301 BW_in01=egress bandwidth of data queue device 301 BW01, Ingress bandwidth of data queue device 303 BW_in02=egress bandwidth of data queue device 303 BW02, Ingress bandwidth of data queue device 305 BW_in03=egress bandwidth of data queue device 305 BW03, Ingress bandwidth of data queue device 307 BW_in01+BW_in02+BW_in03=egress bandwidth of data queue device 307, BW11, and Ingress bandwidth of processing device 317 BW11=egress bandwidth of data queue device 317, BW_out11.

In some embodiments, data queue device 301 can store data having current storage unit count 113 between upper threshold value 117 and lower threshold value 119. In some embodiments, lower threshold value 119 can be larger than 0. When a difference or spread between upper threshold value 117 and lower threshold value 119 is bigger, data queue device 301 can be more bursty, while in comparison, data queue device 301 can be less bursty when a difference between upper threshold value 117 and lower threshold value 119 is smaller. The term "bursty" can be used to measure the changes of a data traffic over time, such as the highest required throughput compared to the lowest required throughput for data traffic. In some embodiments, data queue device 301 can have zero burstiness. When the difference between upper threshold value 117 and lower threshold value 119 is kept small with respect to the average traffic pattern, data queue device 301 can have implemented an automatic bandwidth shaping.

In some embodiments, different methods can be used to manage bandwidth (e.g., data rate) at a queue. A traffic scheduler can be implemented to regulate traffic in and out of the queue at the ingress and some at the egress side, or both sides. A traffic scheduler can implement a weighted fair queuing (WFQ) algorithm, which can be complex and expensive to implement. By using upper threshold value 117 and lower threshold value 119, data queue device 301 can regulate traffic in and out data queue device 301 without the complex and expensive WFQ implementations.

Figure 4:
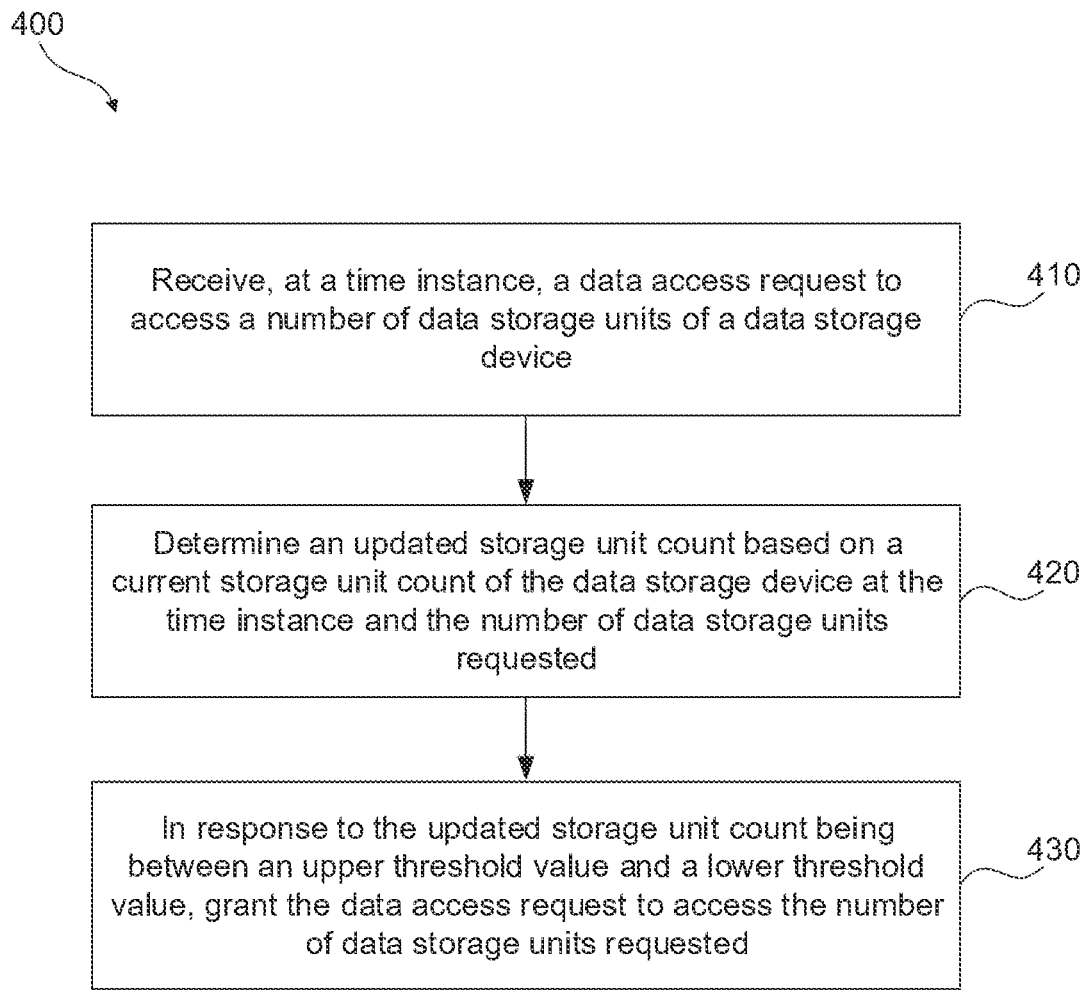
FIG. 4 is an illustration of a method for controlling access to a data storage device shared among multiple processing devices, according to some embodiments.

FIG. 4 is an illustration of a method 400 for controlling access by data access controller 112 to data storage device 114 shared among multiple processing devices, according to some embodiments. For illustrative purposes, the operations illustrated in method 400 will be described with reference to system 100 shown in FIGS. 1A-1B. Other embodiments of system 100 are within the scope of the present disclosure. Also, additional operations may be performed between various operations of method 400 and may be omitted merely for clarity and ease of description. The additional operations can be provided before, during, and/or after method 400, in which one or more of these additional operations are briefly described herein. Moreover, not all operations may be needed to perform the disclosure provided herein. Additionally, some of the operations may be performed simultaneously or in a different order than shown in FIG. 4. In some embodiments, one or more other operations may be performed in addition to or in place of the presently described operations.

At operation 410, data access controller 112 can receive, at a time instance, a data access request to access a number of data storage units of a data storage device. For example, data access controller 112 can receive, at a time instance, data access request 111 to access first number of data storage units 139 of data storage device 114 of data queue device 110.

At operation 420, data access controller 112 can determine an updated storage unit count based on a current storage unit count of the data storage device at the time instance and the number of data storage units requested. For example, data access controller 112 can determine updated storage unit count 115 based on current storage unit count 113 at the time instance and first number of data storage units 139. Current storage unit count 113 can represent a second number of data storage units occupied in data storage device 114 at the time instance, and updated storage unit count 115 can represent a number of data storage units occupied in data storage device 114 had data access request 111 is granted.

At operation 430, in response to a determination that the updated storage unit count is between an upper threshold value and a lower threshold value, data access controller 112 can grant the data access request to access the number of data storage units requested. For example, in response to a determination that the updated storage unit count 115 is between upper threshold value 117 and lower threshold value 119, data access controller 112 can grant data access request 111 to access first number of data storage units 139 of data storage device 114.

In addition, other operations can be performed by data access controller 112. For example, in response to a determination that the updated storage unit count is above the upper threshold value or below the lower threshold value, data access controller 112 can deny the data access request. In some embodiments, the data access request can be a write request received from a producer processing device coupled to the data access controller or a read request received from a consumer processing device coupled to the data access controller.

In some embodiments, data access request 111 can be a write request received from first processing device 121 (e.g., a producer processing device) or a read request received from second processing device 123 (e.g., a consumer processing device). Once data access controller 112 grants data access request 111, data access controller 112 may change counter 116 to increment or decrement after each successful write or read, as described above.

Figure 5:
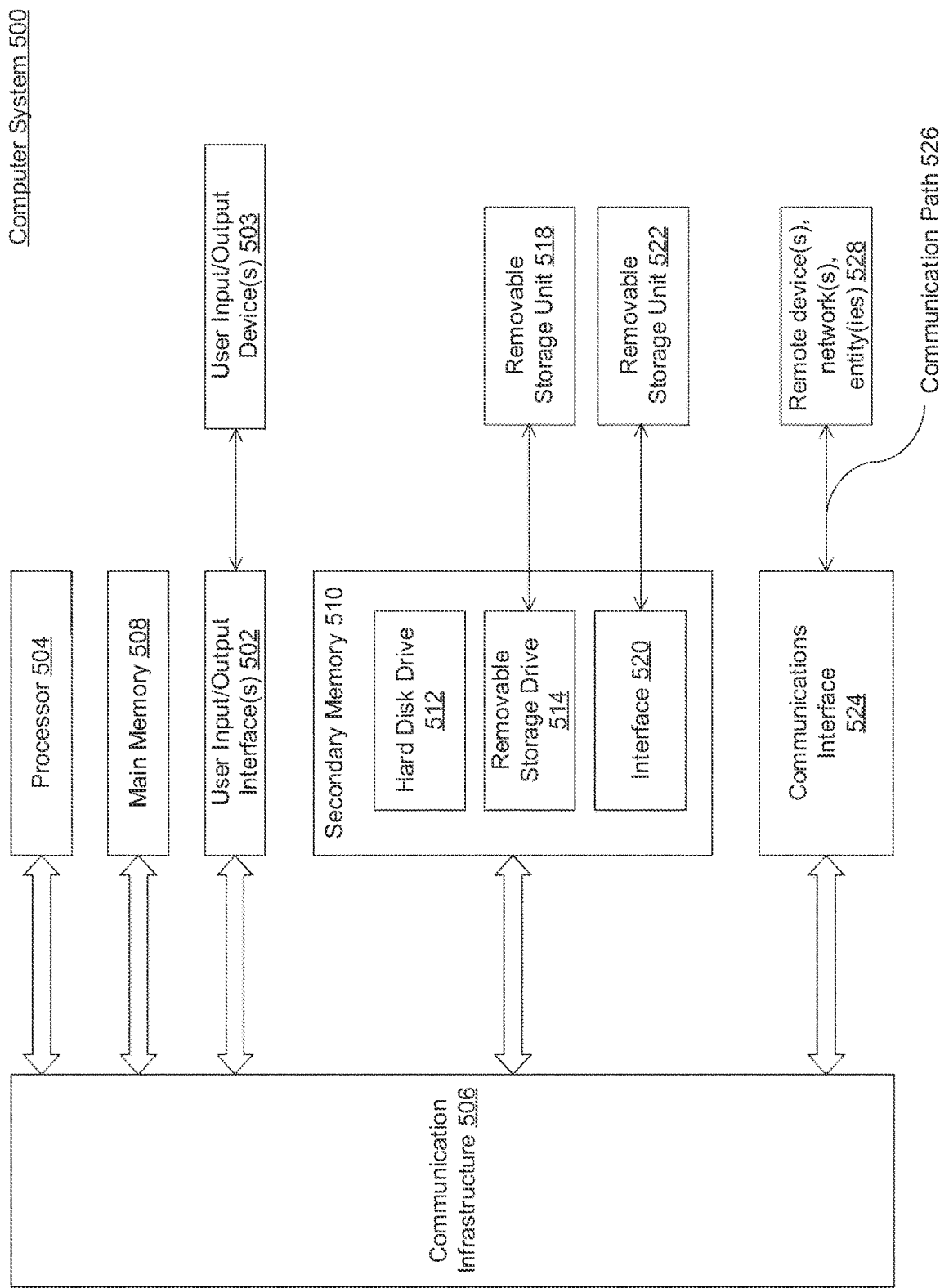
FIG. 5 is an illustration of an example computer system for implementing some aspects or portion(s) thereof of the disclosure provided herein, according to some embodiments.

Various aspects can be implemented, for example, using one or more computer systems, such as computer system 500 shown in FIG. 5. Computer system 500 can be any computer capable of performing the functions described herein for system 100 or system 300, such as the operations described in method 400 of FIG. 4. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for system 100 or system 300 including components, such as processing device or data queue device, as shown in FIGS. 1A-1B, FIG. 3 to perform operations described in method 400 in FIG. 4.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

Figure 6:
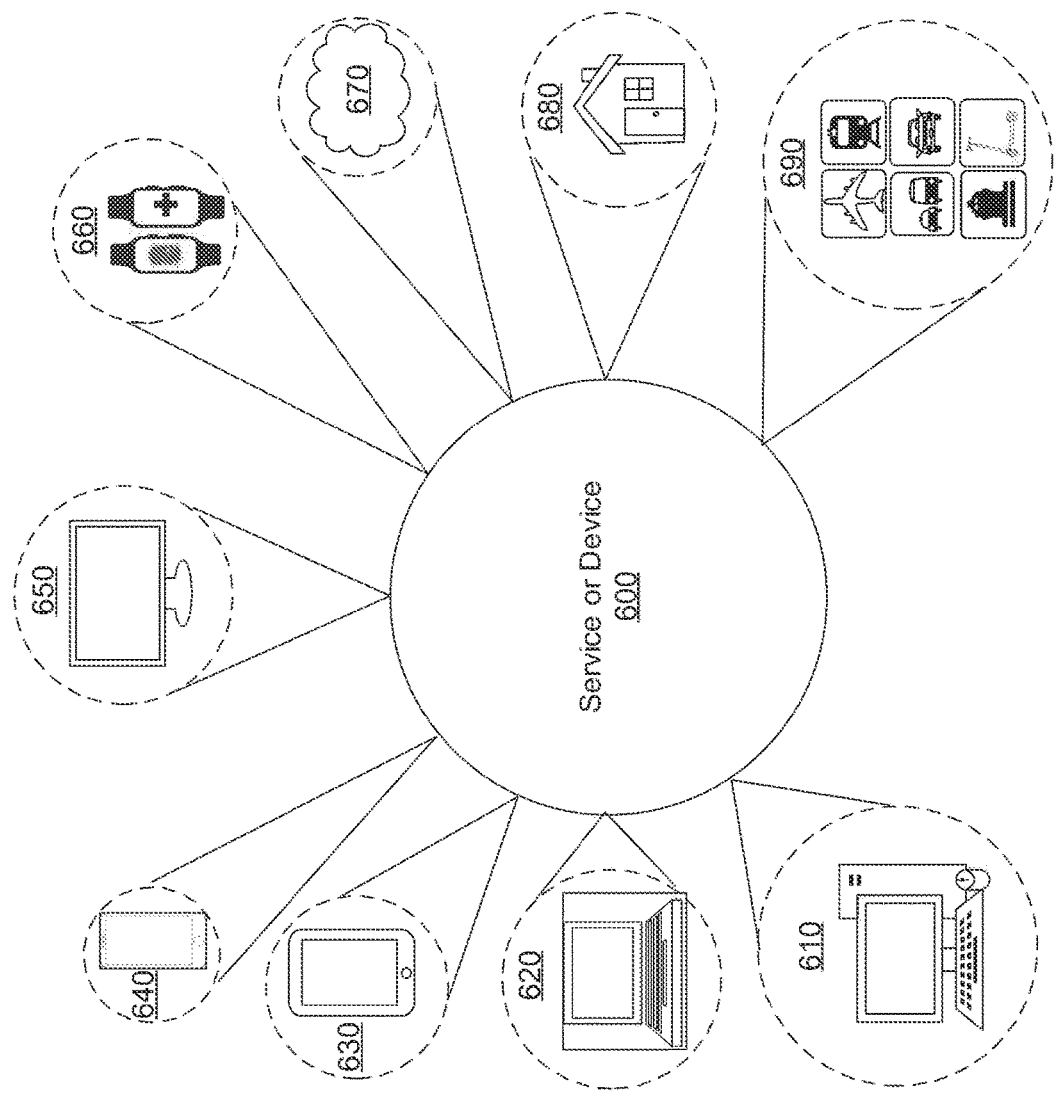
FIG. 6 is an illustration of exemplary systems or devices that can include the disclosed embodiments.

FIG. 6 is an illustration of exemplary systems or devices that can include the disclosed embodiments. System or device 600 can incorporate one or more of the disclosed embodiments in a wide range of areas. For example, system or device 600 can be implemented in one or more of a desktop computer 610, a laptop computer 620, a tablet computer 630, a cellular or mobile phone 640, and a television 650 (or a set-top box in communication with a television). Also, system or device 600 can be implemented in a wearable device 660, such as a smartwatch or a health-monitoring device. In some embodiments, the smartwatch can have different functions, such as access to email, cellular service, and calendar functions. Wearable device 660 can also perform health-monitoring functions, such as monitoring a user's vital signs and performing epidemiological functions (e.g., contact tracing and providing communication to an emergency medical service). Wearable device 660 can be worn on a user's neck, implantable in user's body, glasses or a helmet designed to provide computer-generated reality experiences (e.g., augmented and/or virtual reality), any other suitable wearable device, and combinations thereof.

Further, system or device 600 can be implemented in a server computer system, such as a dedicated server or on shared hardware that implements a cloud-based service 670. System or device 600 can be implemented in other electronic devices, such as a home electronic device 680 that includes a refrigerator, a thermostat, a security camera, and other suitable home electronic devices. The interconnection of such devices can be referred to as the "Internet of Things" (IoT). System or device 600 can also be implemented in various modes of transportation 690, such as part of a vehicle's control system, guidance system, and/or entertainment system.

The systems and devices illustrated in FIG. 6 are merely examples and are not intended to limit future applications of the disclosed embodiments. Other example systems and devices that can implement the disclosed embodiments include portable gaming devices, music players, data storage devices, and unmanned aerial vehicles.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages can depend on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

In this disclosure, different entities (which may variously be referred to as "units," "circuits," other components, etc.) may be described or claimed as "configured to" perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements in a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description can be expressed in a fashion that may appear to be functional. But to those of skill in the art in this field, this HDL description is the manner that is used to transform the structure of a circuit, unit, or component to the next level of implementational detail. Such an HDL description may take the form of behavioral code (which may not be synthesizable), register transfer language (RTL) code (which, in contrast to behavioral code, may be synthesizable), or structural code (e.g., a netlist specifying logic gates and their connectivity). The HDL description may subsequently be synthesized against a library of cells designed for a given integrated circuit fabrication technology, and may be modified for timing, power consumption, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A device, comprising: at least one data storage device; and at least one data access controller coupled to the at least one data storage device, the at least one data access controller configured to: receive, at a time instance, a data access request to access a first number of data storage units of the at least one data storage device; determine an updated storage unit count based on a current storage unit count of the at least one data storage device at the time instance and the first number of data storage units that has been requested but not yet been granted, wherein the current storage unit count represents a second number of data storage units occupied in the at least one data storage device at the time instance; and in response to the updated storage unit count being between an upper threshold value and a lower threshold value, grant the data access request to access the first number of data storage units.

2. The device of claim 1, wherein the at least one data access controller is further configured to, in response to a determination that the updated storage unit count is above the upper threshold value or below the lower threshold value, deny the data access request.

3. The device of claim 1, wherein the data access request is a write request received from a producer processing device coupled to the at least one data access controller or a read request received from a consumer processing device coupled to the at least one data access controller.

4. The device of claim 3, wherein the at least one data access controller is further configured to generate a write signal to write data from the producer processing device to the first number of data storage units and to change the current storage unit count to the updated storage unit count.

5. The device of claim 3, wherein the at least one data access controller is further configured to generate a read signal to enable reading, by the consumer processing device, data from the first number of data storage units.

6. The device of claim 5, wherein the at least one data access controller is further configured to remove the data from the first number of data storage units in response to the data being read and to change the current storage unit count to the updated storage unit count.

7. The device of claim 1, wherein the at least one data storage device comprise a first in first out (FIFO) queue.

8. A system, comprising:
a first processing device;
a second processing device;
at least one data storage device coupled to the first and second processing devices; and
at least one data access controller coupled to the at least one data storage device, the at least one data access controller configured to:
receive a data access request from the first processing device or the second processing device to access a first number of data storage units of the at least one data storage device;
determine an updated storage unit count based on a current storage unit count of the at least one data storage device and the first number of data storage units that has been requested but not yet been granted, wherein the current storage unit count represents a second number of data storage units occupied in the at least one data storage device; and
in response to the updated storage unit count being below an upper threshold value and above a lower threshold value, grant the data access request to access the first number of data storage units.

9. The system of claim 8, wherein the first processing device comprises an operational circuit configured to generate data and a first storage device configured to store the generated data to be written to the first number of data storage units, and wherein the second processing device comprises a second storage device configured to store data read from the first number of data storage units.

10. The system of claim 9, wherein the data access request is a write request received from the first processing device, and wherein:
the at least one data access controller is further configured to, in response to the updated storage unit count being above the upper threshold value or below the lower threshold value, deny the write request; and
the first processing device is configured to store the generated data in the first storage device in response to the write request being denied.

11. The system of claim 9, wherein the data access request is a read request received from the second processing device, and wherein:
the at least one data access controller is further configured to, in response to the updated storage unit count being above the upper threshold value or below the lower threshold value, deny the read request; and
the second processing device is configured to resend the read request after a period of time from when the read request is denied.

12. The system of claim 8, further comprising:
a control processing device configured to provide the upper threshold value and the lower threshold value to the at least one data access controller.

13. The system of claim 8, wherein the first processing device or the second processing device comprises a hierarchical processing device, and wherein the hierarchical processing device comprises a second data storage device, a third processing device, and a fourth processing device coupled to a second data access controller.

14. The system of claim 8, wherein the first processing device or the second processing device comprises a plurality of registers configured to store static configuration parameters for the first processing device or the second processing device.

15. The system of claim 8, wherein the upper threshold value and the lower threshold value are determined based on bandwidth requirements of a communication network system.

16. A method, comprising:
receiving, by at least one data access controller, a data access request to access a first number of data storage units of at least one data storage device coupled to the at least one data access controller;
determining, by the at least one data access controller, an updated storage unit count based on a current storage unit count of the at least one data storage device and the first number of data storage units that has been requested but not yet been granted, wherein the current storage unit count represents a second number of data storage units occupied in the at least one data storage device; and
in response to the updated storage unit count being within a range defined by an upper threshold value and a lower threshold value, granting the data access request to access the first number of data storage units.

17. The method of claim 16, further comprising:
in response to the updated storage unit count being above the upper threshold value or below the lower threshold value, denying the data access request.

18. The method of claim 16, wherein the data access request is a write request received from at least one processing device coupled to the at least one data access controller, and wherein the method further comprises:
generating a write signal to write data from the at least one processing device to the first number of data storage units; and
increasing the current storage unit count to the updated storage unit count.

19. The method of claim 16, wherein the data access request is a read request received from at least one processing device coupled to the at least one data access controller, and wherein the method further comprises:
generating a read signal to enable reading, by the at least one processing device, data from the first number of data storage units.

20. The method of claim 19, further comprising:
removing the data from the first number of data storage units after the data is read; and
changing the current storage unit to the updated storage unit count.

* * * * *

UNITED STATES PATENT AND TRADEMARK OFFICE
CERTIFICATE OF CORRECTION

PATENT NO. : 12,346,605 B1
APPLICATION NO. : 18/446523
DATED : July 1, 2025
INVENTOR(S) : Nie Page 1 of 1

It is certified that error appears in the above-identified patent and that said Letters Patent is hereby corrected as shown below:

In the Claims

In Column 20, Claim 1, Line 14, delete "vet" and insert -- yet --, therefor.

In Column 22, Claim 16, Line 13, delete "vet" and insert -- yet --, therefor.

Signed and Sealed this
Twelfth Day of August, 2025

Coke Morgan Stewart
*Acting Director of the United States Patent and Trademark Office*